United States Patent [19]
Dake et al.

[11] Patent Number: 5,215,779
[45] Date of Patent: Jun. 1, 1993

[54] LOW-SATURATE, ALL PURPOSE PLASTIC SHORTENING WITH SPECIALLY HYDROGENATED INTERMEDIATE-MELTING FAT COMPONENT

[75] Inventors: Timothy W. Dake; David K. Yang, both of Cincinnati; Phillip F. Pflaumer, Hamilton; Paul Seiden, Cincinnati, all of Ohio

[73] Assignee: The Procter & Gamble Company, Cincinnati, Ohio

[21] Appl. No.: 769,744

[22] Filed: Oct. 1, 1991

Related U.S. Application Data

[63] Continuation of Ser. No. 460,783, Jan. 4, 1990, abandoned.

[51] Int. Cl.$^5$ .................................................. A23D 9/00
[52] U.S. Cl. ....................................... 426/601; 426/602; 426/603; 426/604; 426/607
[58] Field of Search ............... 426/601, 602, 603, 607, 426/604

[56] References Cited

U.S. PATENT DOCUMENTS

| | | | |
|---|---|---|---|
| 2,468,799 | 5/1949 | Ziels et al. | 260/409 |
| 2,614,937 | 10/1952 | Baur et al. | 426/601 |
| 2,801,177 | 7/1957 | Lutton | 426/607 |
| 3,102,814 | 9/1963 | Thompson | 426/607 |
| 3,253,927 | 5/1966 | Going et al. | 426/607 |
| 3,298,837 | 1/1967 | Seiden | 426/607 |
| 3,597,229 | 8/1971 | Mijnders et al. | 426/603 |
| 3,597,230 | 8/1971 | Colby | 426/607 |
| 3,687,989 | 8/1972 | Baltes | 260/409 |
| 3,856,831 | 12/1974 | Tateishi et al. | 260/409 |
| 3,872,028 | 3/1975 | Rijnten et al. | 252/439 |
| 3,914,453 | 10/1975 | Gawrilow | 426/553 |
| 3,949,105 | 4/1976 | Wieske et al. | 426/607 |
| 4,041,188 | 8/1977 | Cottier et al. | 426/607 |
| 4,087,564 | 5/1978 | Poot et al. | 426/603 |
| 4,118,342 | 10/1978 | Debus et al. | 252/439 |
| 4,169,843 | 10/1979 | Snyder | 260/409 |
| 4,260,643 | 4/1981 | Cochran | 426/606 |
| 4,268,534 | 5/1981 | Kawada et al. | 426/607 |
| 4,567,056 | 1/1986 | Schmidt | 426/607 |
| 4,590,087 | 5/1986 | Pronk et al. | 426/603 |
| 4,656,045 | 4/1987 | Bodor et al. | 426/601 |

FOREIGN PATENT DOCUMENTS

| | | | |
|---|---|---|---|
| 0290420 | 11/1988 | European Pat. Off. | 426/607 |
| 57-83256 | 5/1982 | Japan | |
| 2182942 | 5/1987 | United Kingdom | |

OTHER PUBLICATIONS

"Bailey's Industrial Oil and Fat Products", ed. Swern, 4th edition. 1979. John Wiley and Sons. New York. pp. 374–379, 382–385, 398–401.

(List continued on next page.)

*Primary Examiner*—Steven Weinstein
*Assistant Examiner*—Anthony J. Weier
*Attorney, Agent, or Firm*—Karen F. Clark; Eric W. Guttag; Tara M. Rosnell

[57] ABSTRACT

An all-purpose plastic shortening exhibiting a reduced concentration of saturates is disclosed. Said low-saturate shortening consists essentially of (a) about 10% to about 30% intermediate-melting fat; (b) about 5% to about 14% fully- or substantially-hydrogenated hardstock; (c) about 50% to about 84% unhydrogenated or partially-hydrogenated base oil; and (d) about 0.5% to about 10% of an emulsifier. Said intermediate-melting fat comprises from about 14% to about 35% $C_{12}$–$C_{18}$ saturated fatty acids; at least about 8% $C_{16}$ saturated fatty acids (by percentage of total fat); at least about 60% of all double bonds in the trans-configuration; at least about 40% solids (SFC) at 21.1° C. (70° F.); no more than about 5% $C_{18:2}$ fatty acids; and has an iodine value of about 55 to about 75. Said hardstock contains at least about 33% $C_{16}$ saturated fatty acids and has an iodine value of about 12 or less. Said base oil comprises no more than about 11% $C_{12}$–$C_{18}$ saturated fatty acids and has an iodine value of about 75 or more.

21 Claims, No Drawings

OTHER PUBLICATIONS

"Food Chemistry" 2nd Edition. ed. Fennema. 1985. Marcel Dekker, Inc. New York. p. 149.

Szelag, H. and W. Zwierzykowski, "The Application of Molecular Distillation to Obtain High Concentration of Monoglycerides," *Fette Seifen Anstrichmittel*, vol. 85, No. 11 (1983), pp. 443-446.

Lutton, E. S., "The Phases of Saturated 1-Monoglycerides $C_{14}$-$C_{22}$," *J. Amer. Oil Chem Soc.*, Dec. 1971, vol. 48, No. 12, pp. 778-781.

Lutton, E. S., "Phase Behavior of Aqueous Systems of Monoglycerides," *J. Amer. Oil Chem. Soc.*, Dec. 1965, vol. 42, No. 12, pp. 1068-1070.

Lauridsen, J. D., "Food Emulsifiers: Surface Activity, Edibility, Manufacture, Composition and Application," *J. Amer. Oil Chem. Soc.*, 1976, vol. 53, pp. 400-407.

Ostrander, A. J., J. K. Abbott; and A. M. Campbell, "Shortening Power and Related Properties of Fat as Affected by Substitution of Elaidinized Lipid," *The Bakers Digest*, Apr. 1971, vol. 45, No. 2, pp. 28-30.

Flack, E. A. and N. Krog, "The Functions and Applications of Some Emulsifying Agents Commonly Used in Europe," *Food Trade Review*, vol. 40, 1970, No. 8, pp. 27-33.

Abraham, V. and J. M. de Man; "Removal of Sulfur Compounds from Canola Oil," *J. Amer. Oil Chem. Soc.*, vol. 65, pp. 392-395.

Okonek, D. G., "Nickel-Sulfur Catalysts for Edible Oil Hydrogenation," printed as Ch. 5 of *Hydrogenation: Proceedings of an AOCS Colloquim*, pp. 65-88, edited by Robert Hastert (1987).

Carr, R. A., "Hydrogenation Feedstock," printed as Ch. 6 in *Hydrogenation: Proceedings of An AOCS Colloqium*, pp. 89-98, edited by Robert Hastert (1987).

LOW-SATURATE, ALL PURPOSE PLASTIC SHORTENING WITH SPECIALLY HYDROGENATED INTERMEDIATE-MELTING FAT COMPONENT

This is a continuation of application Ser. No. 07/460,783, filed on Jan. 4, 1990, now abandoned.

TECHNICAL FIELD

The present invention relates to an all-purpose plastic shortening exhibiting a reduced concentration of saturates.

BACKGROUND INFORMATION

All-purpose plastic shortenings are conventionally produced by the appropriate thermal and mechanical treatment of a mixture of fats consisting of two or three components. In the production of plastic shortenings the components must be used together in a properly coordinated fashion to insure that the shortening made therefrom exhibits the desired degree of plasticity. Conventional two-component shortenings consist of a high-melting substantially- or wholly-hydrogenated solid fat, commonly called "hardstock", and a lower-melting (as compared to hardstock) partially-hydrogenated semi-solid fat, commonly called "basestock". Conventional three-component shortenings also consist of a hardstock and a "basestock", but said basestock is composed of an unhydrogenated or partially-hydrogenated liquid oil or base oil, as well as an intermediate-melting partially-hydrogenated semi-solid fat, commonly called "intermediate-melting fat". The basestock of two-component shortenings is generally prepared in such a way that it implicitly contains intermediate-melting fat and base oil but the shortenings made therefrom are classified as two-component shortenings because they contain the basestock as one component (albeit implicitly containing the equivalents of the base oil and the intermediate-melting fat of three-component shortening) and the hardstock as the other component All two-and three-component shortenings typically contain an emulsifier as an additional component. Whether characterized as a two- or three-component all-purpose plastic shortening, conventional plastic shortening generally contains from about 23% to about 48% saturated fatty acids (i.e., $C_{12}$–$C_{18}$ saturated fatty acid ester groups, also referred to hereinafter as "saturates").

Recently, public consciousness has been raised regarding the dietary intake of saturated fats and the relationship of said dietary intake with serum cholesterol levels and with the HDL/LDL ratio therein, i.e., the ratio of high density lipoproteins (hereinafter HDL, i.e, "good" cholesterol) to low density lipoproteins (hereinafter LDL, i.e., "bad" cholesterol). See, for example, "Saturated Fats and Coronary Heart Disease," by Scott M. Grundy, M.D., Ph.D., in Current Concepts of Nutrition, Vol 10, pp. 57–78 (1981) for an examination of the elevating effect of saturated fats on total serum cholesterol and on atherosclerosis. For a study demonstrating that mono- and polyunsaturates lower LDL cholesterol as compared to saturates, see "Comparison of Effects of Dietary Saturated, Monounsaturated, and Polyunsaturated Fatty Acids on Plasma Lipids and Lipoproteins in Man" by Fred H. Mattson and Scott M. Grundy, in *Journal of Lipid Research.* Vol. 26, pp. 194–202 (1985). Thus, one of the indices that dieticians use to judge nutritional quality of fats is the ratio of polyunsaturates to saturates (hereinafter the P/S ratio) therein.

It has surprisingly been found that, by utilizing a specially hydrogenated intermediate-melting fat in combination with a hardstock and a base oil low in saturates in an all-purpose-plastic shortening, the amount of saturates necessary to achieve the desired plasticity in the all-purpose shortening formulation is reduced. This is accomplished predominantly by the reduction of the amount of saturates in the base oil and/or the intermediate-melting fat. The said reduction of saturates is made possible because of the presence of the said specially-hydrogenated intermediate-melting fat which more efficiently utilizes the saturated fatty acids and trans-isomers of unsaturated fatty acids in the fatty components of the shortening formulation to form solids; accordingly, sufficient solids are formed more efficiently and with less saturates, thereby achieving the desired plasticity in the resulting all-purpose plastic shortening. Accordingly, the low saturate all purpose plastic shortening of the present invention has from about 10% to about 20% saturates, as compared to conventional shortenings which have from about 23% to about 48% saturates.

It is also a requirement that the low-saturate plastic shortenings of the present invention exhibit good creaming ability and retain their appearance, volume, and performance characteristics under expected storage conditions. Accordingly, it is necessary in the production and storage of plastic shortenings to insure that the glycerides present therein are in, and remain in, throughout production and shipment by manufacturers and use and storage by consumers, the proper crystalline phase. It is well known that the beta-prime crystalline phase of glycerides is most preferred for plastic shortenings due to its capacity to form an interlocking crystalline structure and hold large amounts of oil. A shortening that contains solid glycerides that transform or recrystallize into the beta crystal phase often tends to produce graininess. To achieve a plastic shortening that exhibits and retains acceptable rheological characteristics over expected storage conditions, it is necessary that the solid glycerides therein crystallize and remain in the beta-prime crystalline form.

It has surprisingly been found that certain beta-prime stabilizing long-chain diglycerides and/or triglycerides are especially suitable for use in the low-saturate shortening of the present invention and impart enhanced beta-prime stability thereto.

In certain food products which are prepared with plastic shortening, such as frostings, icings, and cake batters, it is important to the preparation of the product that the shortening used therein imparts sufficient emulsion-, viscosity-, and foam-stability to the food product.

It has surprisingly been found that certain long-chain monoglycerides high in long chain ($C_{20}$–$C_{24}$) fatty acids when used in conjunction with $C_{16}$–$C_{18}$ fatty acid mono- and/or diglycerides enhance the viscosity, emulsifying capabilities, and foam-stability of the food products containing the low-saturate shortening of the present invention.

It is therefore an object of the present invention to provide a low-saturate, all-purpose, plastic shortening suitable for use in a broad range of applications consisting of, but not limited to, pies, cakes, biscuits and other baked goods; frostings; icings; fried foods; and the like.

It is an additional object of the present invention to produce a low-saturate shortening which exhibits enhanced beta-prime crystalline phase stability.

It is a further object of the present invention to provide a low-saturate shortening which enhances the emulsion-, viscosity-, and foam-stability of icings, frostings, and cake batters during their preparation. Said enhancement results in icings, frostings, and cakes exhibiting improved taste, appearance, and texture.

These and other objects of the present invention will become clear by the disclosure herein All percentages and ratios herein are by weight unless otherwise specified.

SUMMARY OF THE INVENTION

The present invention is directed to an all-purpose plastic shortening composition which has a reduced level of saturates. Said low-saturate shortening comprises: 1) less than about 20%, preferably less than about 18%, $C_{12}$–$C_{18}$ saturated fatty acids; and 2) at least about 12%, preferably at least about 13%, solids (Solids Content Index, hereinafter SCI) at 21.1° C. (70° F.). It is also preferable (but certainly not mandatory) that 1) the shortening of the present invention have a polyunsaturate/saturate ratio (hereinafter P/S) of at least about 0.5, and most preferably of at least about 0.8, and 2) preferably less than about 20% trans-isomers of unsaturated fatty acids.

The low-saturate shortening of the present invention is made up of four components: 1) the specially hydrogenated intermediate-melting fat; 2) the base oil; 3) the hardstock; and 4) an emulsifier. Accordingly, the shortening of the present invention comprises:

1) from about 10% to about 30%, preferably from about 13% to about 25%, of a specially hydrogenated intermediate-melting fat, said fat comprising about 14% to about 35%, preferably about 16% to about 30%, $C_{12}$–$C_{18}$ saturated fatty acids; at least about 8% $C_{16}$ saturated fatty acids; no more than about 5%, preferably no more than about 3%, $C_{18:2}$ fatty acids; at least about 40%, preferably at least about 45%, trans-isomers of unsaturated fatty acids; at least about 60%, preferably at least about 65%, of all double bonds in the trans configuration; at least about 40%, preferably at least about 45%, solids (Solid Fat Content, hereinafter SFC) at 21.1° C. (70° F.); and an iodine value of about 55 to about 75, preferably of about 60 to about 70;

2) from about 5% to about 14%, preferably from about 6% to about 10%, fully- or substantially-hydrogenated hardstock, said hardstock comprising at least about 33%, preferably at least about 36% $C_{16}$ saturated fatty acids: preferably at least about 80%, most preferably at least about 90% of said $C_{16}$ saturated fatty acids are esterified to either the one or three position of the glycerol backbone of the triglyceride molecule; and an iodine value of about 12 or less, preferably about 10 or less, most preferably of about 5 or less;

3) from about 50% to about 84%, preferably from about 60% to about 79%, unhydrogenated or partially-hydrogenated base oil, said base oil comprising no more than about 11%, preferably no more than about 8%, $C_{12}$–$C_{18}$ saturated fatty acids an iodine value of about 75 or more, preferably of about 94 or more; and preferably no more than about 17% trans-isomers of unsaturated fatty acids. It is also preferable that said base oil comprises no more than about 5% $C_{18:3}$ fatty acids; and at least about 14%, most preferably at least about 17%, cis-cis polyunsaturated fatty acids; and 4) from about 0.5% to about 10%, preferably at least about 2% to about 5% of an emulsifier.

The term "low-saturate, all-purpose plastic shortening" as used herein refers to a plastic shortening which is useful in a broad range of food applications including, but not limited to, pies, cakes, biscuits and other baked goods; frostings; icings; fried foods; and the like. Said low-saturate plastic shortening also has from about 10% to about 20% saturated fatty acids while conventional plastic shortening generally has from about 23% to about 48% saturated fatty acids.

The term "specially hydrogenated intermediate-melting fat" as used herein describes the product resulting from the selective hydrogenation of a vegetable and/or animal oil (including, for example, marine oil) to an Iodine Value of from about 55 to about 75, preferably from about 60 to about 70, and which provides intermediate-melting solids in the shortening.

The term "base oil" as used herein refers to an oil which is substantially liquid at room temperature and has an Iodine Value of about 75 or more, preferably about 94 or more. The base oil can be an unhydrogenated oil, a partially-hydrogenated oil, or a blend of unhydrogenated and partially-hydrogenated oils.

As used herein, the term "fully- or substantially-hydrogenated hardstock" relates to solid fats which have an Iodine Value of about 12 or less, preferably about 10 or less, most preferably of about 5 or less. The hardstock suitable for use in the shortening of the present invention is generally identical to that used in conventional shortenings and generally has from about 86% to about 99% saturates.

The term "emulsifier" as used herein denotes any emulsifier, or blends of such emulsifiers, known in the art. These consist of, but are not limited to, monoglycerides and/or diglycerides of $C_{16}$–$C_{18}$ saturated/unsaturated fatty acids, $C_{20}$–$C_{24}$ saturated/unsaturated fatty acids, and mixtures thereof. Especially suitable emulsifiers for use in the shortening of the present invention, in combination with each other and other emulsifiers, are the beta-prime stabilizing long-chain diglyceride component and the long-chain monoglyceride component as described herein.

The term "fatty acid" as used herein refers to the fatty acid ester portion of the respective glyceride.

The terms "saturates", "saturated fats", and "saturated fatty acids" as used herein all refer to $C_{12}$–$C_{18}$ saturated fatty acid esters, unless otherwise indicated.

The term "cis-cis" as used herein refers to the combined amounts of linoleic and linolenic polyunsaturated fatty acids.

DETAILED DESCRIPTION OF THE INVENTION

The present invention relates to a low-saturate all-purpose plastic shortening which comprises: less than about 20%, preferably less than about 18%, saturated $C_{12}$–$C_{18}$ fatty acids; and at least about 12%, preferably at least about 13%, solids (SCI) at 21.1° C. (70° F.). In addition, it is preferable that the shortening of the present invention has a polyunsaturate to saturate ratio (P/S) of at least about 0.5, and most preferably of at least about 0.8, and preferably less than about 20% trans-isomers of unsaturated fatty acids.

Solids Content Index (SCI) is a measurement of the amount of solids present in a shortening at a particular temperature. SCI values herein are measured by the dilatometric method of Fulton, Lutton and Willie, J. A. O. C. S. Vol. 31, pp. 98–103 (1954), incorporated herein by reference. A discussion of the SCI measurement is set forth in Section A of the Analytical Methods section herein following the Examples.

GCFAC (Gas Chromatography Fatty Acid Composition) is used to define the shortening of the present invention and the fatty acid composition of the components thereof. The method used is explained in Section B of the Analytical Methods section herein.

The level of trans-isomers of unsaturated fatty acids in the specially hydrogenated intermediate-melting fat, the base oil, and the low-saturate shortening of the present invention is measured by Infrared Spectrophotometry. The method used is explained in Section C of the Analytical Methods section herein.

The shortening of the present invention is made up of four components including: 1) from about 10% to about 30%, preferably about 13% to about 25%, of a specially hydrogenated intermediate-melting fat; 2) from about 5% to about 14%, preferably from about 6% to about 10%, of a fully- or substantially-hydrogenated hardstock; 3) from about 50% to about 84%, preferably from about 60% to about 79% of an unhydrogenated or partially-hydrogenated base oil; and 4) from about 0.5% to about 10%, preferably from about 2% to about 5%, of an emulsifier.

Said specially-hydrogenated intermediate-melting fat comprises: 1) from about 14% to about 35%, preferably from about 16% to about 30%, $C_{12}$–$C_{18}$ saturated fatty acids; 2) at least about 8% $C_{16}$ saturated fatty acids; 3) no more than about 5%, preferably no more than about 3%, $C_{18:2}$ fatty acids; 4) at least about 40%, preferably at least about 45% trans-isomers of unsaturated fatty acids; 5) at least about 60%, preferably at least about 65%, of all double bonds in the trans-configuration; 6) at least about 40%, preferably at least about 45%, solids (SFC) at 21.1° C. (70° F.); and 7) an iodine value of about 55 to about 75, preferably of about 60 to about 70.

As previously stated herein, the intermediate-melting fat has a solid content (SFC) of at least about 40%, preferably at least about 45%, at 21.1° C. (70° F.). The SFC provides a reasonable approximation of the percent by weight solids of a particular fatty material at a given temperature. The method of measuring the SFC of the intermediate melting fat is performed according to the method described by Madison and Hill, *J. Amer. Oil Chem. Soc.*, Vol. 55, (1978), pp. 328–31, incorporated by reference herein and is set forth in Section D of the Analytical Methods section herein following the Examples.

SFC (Solid Fat Content) is a measurement of the solids in the specially hydrogenated intermediate-melting fat. As stated previously, SCI (Solids Content Index) is used to measure the solids in the finished shortening. While both systems measure solids, SCI is the best measurement for relatively low concentrations of solids, and SFC is the best measurement for relatively high concentrations of solids. SCI is described in Section A of the Analytical Method section herein and SFC is described in Section D of the Analytical Method section herein.

Said fully or substantially hydrogenated hardstock has at least about 33%, preferably at least about 36%, $C_{16}$ saturated fatty acids. It is also preferable that at least about 80%, most preferably at least about 90%, of the $C_{16}$ saturated fatty acids are esterified to either the one or the three position of the glycerol backbone of the triglyceride molecule. Said hardstock has an iodine value of about 12 or less, preferably about 10 or less, most preferably of about 5 or less.

Said unhydrogenated or partially-hydrogenated base oil has an iodine value of about 75 or more, preferably of about 94 or more; has no more than about 11%, preferably no more than about 8%, $C_{12}$–CIB saturated fatty acids; preferably no more than about 17% trans-isomers of unsaturated fatty acids; preferably no more than about 5% $C_{18:3}$ fatty acids; preferably at least about 14%, most preferably at least about 17%, cis-cis polyunsaturated fatty acids.

It is possible to achieve the desired plasticity in the low-saturate plastic shortening of the present invention by making more efficient use of saturated and trans fatty acid components to form solids. The intermediate-melting fat of the present invention has a relatively high proportion of unsaturated fatty acids in the trans configuration. The trans-isomers of unsaturated fatty acids help form the intermediate-melting solids and reduce the amount of saturates needed to form these solids. It is believed that the most desirable triglyceride for forming the intermediate-melting solids contains one saturated fatty acid and two trans mono-isomers of unsaturated fatty acids per triglyceride molecule. It is believed that this triglyceride is a major component of the intermediate melting fat of this invention. However, other combinations of trans, cis, and saturated fatty acids also exist as triglycerides in the intermediate-melting fat and also contribute to solids in the shortening.

Since the base oil contributes very few solids to the shortening, and since it is preferred to keep the concentrations of both the saturates and trans-unsaturates in the shortening as low as possible, the saturates and trans-unsaturates levels of the base oil should be kept as low as possible. Saturates and trans-unsaturates of the shortening should be utilized as much as possible in the hardstock and intermediate-melting fat to form solids, rather than using them in the base oil where their functionality is greatly reduced.

THE COMPONENTS OF THE LOW-SATURATE ALL-PURPOSE SHORTENING

A. The Specially Hydrogenated Intermediate-Melting Fat

The low-saturate all-purpose plastic shortening of the present invention consists of from about 10% to about 30%, preferably about 13% to about 25%, of an intermediate-melting fat. The intermediate-melting fat is made by subjecting a suitable vegetable and/or animal oil to hydrogenation under highly selective conditions so that the resulting intermediate-melting fat has the following characteristics:

1) from about 14% to about 35%, preferably from about 16% to about 30%, saturated $C_{12}$–$C_{18}$ fatty acids;
2) at least about 8% $C_{16}$ saturated fatty acids;
3) no more than about 5%, preferably no more than about 3%, $C_{18:2}$ fatty acids;
4) at least about 40%, preferably at least about 45%, trans-isomers of unsaturated fatty acids, (by percentage of total fat);
5) at least about 60%, preferably at least about 65%, of all double bonds in the trans-configuration;
6) at least about 40%, preferably at least about 45%, solids (SFC) at 21.1° C. (70° F.); and 7) an iodine value (I.V.) of about 55 to about 75, preferably of about 60 to about 70.

The specially hydrogenated intermediate-melting fat provides the intermediate-melting solids necessary to achieve sufficient plasticity in the shortening of the present invention predominately by the presence of $C_{18:1}$ trans fatty acids in the triglycerides. Said intermediate-melting fat is selectively hydrogenated, preferably by using a sulfur-treated nickel catalyst. However, other catalysts may be used as long as the intermediate-melting fat has the required characteristics. Sulfur-treated catalysts are particularly suitable for use since they promote the rapid development of trans isomers during hydrogenation. See, e.g. Okonek, Douglas V., "Nickel-Sulfur Catalysts For Edible Oil Hydrogenation," printed as Chapter 5 of *Hydrogenation: Proceedings of An AOCS Colloquim,* edited by Robert Hastert, 1987. The sulfur-treated catalyst suitable for use in the present invention can be prepared by any method known in the art.

A preferred sulfur-treated catalyst is Nysel SP-7 (manufactured by Engelhard Corporation, Catalyst and Chemicals Division, Edison, N.J. 08818). This catalyst contains about 1% sulfur and 20% nickel. It is typically used at a concentration of about 0.25% to about 1.0% of the oil to be hydrogenated.

The process described herein for making the intermediate-melting fat is a batch hydrogenation process. However, any type of commercially acceptable processing operation, including, but not limited to, batch hydrogenation, continuous processing, recirculation systems, and "dead-end" systems, may be utilized.

Hydrogenation is normally carried out in from about 1.5 hours to about 6 hours. The hydrogen pressure exerted during hydrogenation ranges from about 0 PSIG to about 150 PSIG and the temperature ranges from about 160° C. (320° F.) to about 260° C. (500° F.). The temperature of the reaction is gradually increased from about 160° C. (320° F.) to about 200° C. (392° F.), and preferably about 180° C. (356° F.), to a final temperature of from about 220° C. (428° F.) to about 260° C. (500° F.), and preferably about 240° C. (464° F.). The lower temperatures are preferred at the beginning of hydrogenation to avoid polymerization of $C_{18:3}$-containing triglycerides. The higher temperatures are preferred near the end of the reaction, after most of the $C_{18:3}$ is hydrogenated, to accelerate the reaction. The reaction is terminated when the iodine value (I.V.) reaches a value of from about 55 to about 75, and preferably from about 60 to about 70. Other reaction conditions may be employed so long as the resulting intermediate-melting fat meets the specifications stated herein.

Sulfur treated nickel selective hydrogenation is described in the following U.S. patents, all incorporated by reference herein: U.S. Pat. No. 2,468,799 to Ziels et al. (assigned to Lever Bros. Co.), issued May 3, 1949; U.S. Pat. No. 3,687,989 to Baltes, issued Aug. 29, 1972; 3,872,028 to Rijnten (assigned to Lever Bros. Co.), issued Mar. 18, 1975; U.S. Pat. No. 4,041,188 to Cottier et al. (assigned to Lever Bros. Co.), issued Aug. 9, 1977; 4,061,798 to Kanegae et al., issued Dec. 6, 1977; U.S. Pat. No. 4,087,564 to Poot et al. (assigned to Lever Bros. Co.), issued May 2, 1978; U.S. Pat. No. 4,118,342 to Debus et al. (assigned to Labofina, S. A.), issued Oct. 3, 1978; and U.S. Pat. No. 4,169,843 to Snyder (assigned to Kraft, Inc.), issued Oct. 2, 1979. During the sulfur-treated nickel selective hydrogenation, $C_{18:1}$ trans-isomers are rapidly and selectively formed. $C_{18:2}$ (linoleic) and $C_{18:3}$ (linolenic) fatty acids are selectively hydrogenated to yield $C_{18:1}$ fatty acids. The $C_{18:1}$ cis fatty acids are isomerized to $C_{18:1}$ trans and other $C_{18:1}$ cis isomers where the double bond has migrated to another position along the alkyl fatty acid chain.

To achieve the specially hydrogenated intermediate-melting fat having the above-specified characteristics via selective hydrogenation using a sulfur-treated nickel catalyst, various source oils are suitable. These oils should have a level of total saturates of less than 35%, preferably less than 30%, and a level of $C_{16}$ saturated fatty acids of at least about 8%. Accordingly, suitable source oils include, but are not limited to, soybean, cottonseed, peanut, olive, corn, menhaden, herring, linseed, sesame, rice, bran, perrilla, and sorghum. Canola, safflower, sunflower, and palm are suitable for use in oil blends. Certain oil fractions such as, but not limited to, cottonseed olein and palm olein are suitable. Mixtures of the above source oils, source oil blends, and source oil fractions are suitable for use herein.

The intermediate-melting fat has an iodine value (I.V.) of from about 55 to about 75, preferably from about 60 to about 70. The I.V. of a fat or oil indicates the number of grams of Iodine equivalent to halogen absorbed by a 100 gram sample. Because the halogen absorbance is due to the double bonds present in the fatty acid residues attached to the glycerides, the I.V. of a fat or oil can give a general indication of solids content at a given temperature. As the fatty acid residues become more saturated, the fat or oil increases in solids content. In general, the lower the I.V. of a given fat or oil, the greater will be the solids content at a given temperature. The I.V. of a fat or oil can be determined by the AOCS Official Method Col. 1-25, also known as the Wijs method.

In addition, as mentioned above, the intermediate-melting fat should have at least about 8% $C_{16}$ saturated fatty acids. It is well known in the art that $C_{16}$ saturated fatty acids enhance beta-prime stability. It is necessary that about 80%, preferably about 90%, of said $C_{16}$ saturated fatty acids be positioned on the one and/or three carbon of the glycerol backbone to enhance beta-prime stability.

B. The Base Oil

The base oil to be utilized in the shortening of the present invention is an oil which has an iodine value of about 75 or more, preferably of about 94 or more, and which is substantially liquid at room temperature. In addition, said base oil is an unhydrogenated or partially-hydrogenated fat which has no more than about 11%, preferably no more than about 8%, $C_{12}$–$C_{18}$ saturated fatty acids. It is also preferable that said base oil comprise at least about 14%, most preferably at least about 17%, cis-cis polyunsaturated fatty acids; no more than about 5% $C_{18:3}$ fatty acids; and preferably no more than about 17% trans-isomers of unsaturated fatty acids.

To achieve a base oil exhibiting the above-specified characteristics, it is preferable to combine partially-hydrogenated (I.V.=95–107) canola oil with unhydrogenated sunflower oil. Canola oil is particularly suitable because it has the desired low level of saturated fatty acids. However, canola oil typically also contains high levels (e.g., 7–12%) of $C_{18:3}$ fatty acid (linolenic acid). Lower $C_{18:3}$ levels can result in improved flavor stability. Therefore, in the preferred embodiment, the C18:3 level should be no more than 5% of the base oil.

One way of achieving a base oil with the preferred composition is to combine partially-hydrogenated canola oil with a high-linoleic oil such as sunflower oil. The canola oil is hydrogenated under selective conditions, using a nickel catalyst, to an I.V. of about 95–107. By hydrogenating under selective conditions, the level of C18:3 is reduced, with only a small increase in the level of saturates. However, this hydrogenation also reduces the amount of cis-cis polyunsaturates in the canola and increases the amount of trans-isomers. Typically, this hydrogenation will reduce the level of cis-cis polyunsaturates below the most preferred level of 17% or greater. To compensate for this, an oil rich in cis-cis polyunsaturates, such as sunflower oil, is added to the base oil. Because sunflower oil is higher in saturates than the preferred level, the smallest amount needed to achieve the desired cis-cis level in the base oil should be used. It is preferable to mix about 25% or less sunflower oil with about 75% or more partially hydrogenated canola oil to form the base oil.

Before hydrogenating the canola oil, it may be desirable to reduce the level of catalyst poisons in the oil. Catalyst poisoning is believed to be due primarily to sulfur containing compounds in the oil. See, e.g., Carr, R. A., "Hydrogenation Feedstock" printed as Chapter 6 in *Hydrogenation: Proceedings of an AOCS Colloquim*—Robert Hastert, Editor (1987) American Oil Chemists Society, Champaign, Ill., hereby incorporated by reference herein. These sulfur compounds are believed to absorb onto the nickel catalyst surface in the early part of the hydrogenation process. Use of the poisoned catalyst will result in greater formation of trans-isomers during hydrogenation, with higher levels of sulfur compounds in the oil resulting in higher trans levels in the partially-hydrogenated oil. Trans isomers in the base oil are not desirable, since they do not contribute significantly to shortening solids, but add to the total trans in the shortening. While the formation of transisomers cannot be completely eliminated, the amount formed can be reduced by first reducing the amount of sulfur poisons in the oil prior to hydrogenation. For additional information regarding reducing the amount of said sulfur poisons see Abraham, V. & DeMann, J. M., "Removal of Sulfur Compounds from Canola Oil," Journal of American Oil Chemists Society, Vol. 65, p. 392, (1988), hereby incorporated by reference herein.

While several methods may be used to reduce the amount of catalyst poisons in the oil, a preferred method is to first pretreat the oil with catalyst, as set forth in Example IV herein. Nickel catalyst is added to the oil and the oil is heated. The catalyst, with adsorbed sulfur compounds, is then filtered out of the oil. Following this, the oil is hydrogenated using fresh catalyst.

Other oils, both hydrogenated and unhydrogenated, are also suitable for the preferred embodiment, as long as they meet the above-specified characteristics. This includes varieties of canola which are naturally low in $C_{18:3}$ fatty acids(e.g., Stellar canola oil), and which would not require partial-hydrogenation. Accordingly, there would be no generation of trans-isomers of unsaturated fatty acids because there would be no hydrogenation.

Although the unhydrogenated sunflower seed oil/-partially-hydrogenated canola oil mixture is preferably used to make a base oil suitable for use in the shortening of the present invention, the source oils and/or the method used to make the base oil are not important, so long as the base oil is an unhydrogenated or partially-hydrogenated oil which has no more than about 11%, preferably no more than about 8%, $C_{12}$–$C_{18}$ saturated fatty acids; preferably at least about 14%, most preferably at least about 17% cis-cis polyunsaturated fatty acids; preferably no more than about 5% $C_{18:3}$ fatty acids; and preferably no more than about 17% trans-isomers of unsaturated fatty acids. Of course, genetically bred source oils having the requisite characteristics would be suitable.

C. The Hardstock

The shortening of the present invention contains from about 5% to about 14%, preferably from about 6% to about 10%, hardstock. Said hardstock is solid at room temperature and provides solids from saturated fatty acids. Said solids are needed to provide high temperature stability to, and to contribute to the desired plasticity of, the shortening. The hardstock is made by the substantial or total hydrogenation (I.V. 12 or less, preferably 10 or less, and most preferably 5 or less) of a suitable oil or mixtures thereof. Suitable oil(s) may be chosen from the group consisting of, but not limited to, palm oil, cottonseed stearin, palm mid-fraction, palm olein, or mixtures thereof. Peanut oil, corn oil and/or palm stearin may be used in blends. In addition, the hardstock must contain at least about 33%, preferably at least about 36%, $C_{16}$ saturated fatty acids. It is also preferable that at least about 80%, most preferably at least about 90%, of said $C_{16}$ saturated fatty acids are esterified to either the one or three position of the glycerol backbone of the triglyceride molecule.

A particularly effective hardstock for use in the shortening of the present invention is that described in U.S. Pat. No. 3,597,230 to Colby et al. (assigned to The Procter & Gamble Company), issued Aug. 3, 1971. A very good source of triglycerides containing long chain fatty acids meeting these specifications is hardened high-erucic acid rapeseed oil. By "high-erucic acid rapeseed oil" as used herein is 1 meant a rapeseed oil which contains at least 40% $C_{22}$ fatty acids. A suitable high-erucic acid rapeseed oil may be obtained from Humko Products, Memphis, Tenn. 38101. It is preferred that the shortening contains from about 0.2% to about 1.0% hardened high-erucic acid rapeseed oil which has an I.V. of no more than about 15.

D. The Emulsifier

The shortening of the present invention contains from about 0.5% to about 10%, preferably from about 2% to about 5%, based upon the weight of the shortening, of a suitable emulsifier. Suitable emulsifiers include, but are not limited to, saturated and unsaturated mono- and diglycerides of $C_{16}$–$C_{24}$ fatty acids and mixtures thereof. One skilled in the art can use any of the available and suitable emulsifiers according to the desired characteristics of the shortening and/or the final food product to be made with said shortening. A particularly suitable emulsifier for use in the low saturate shortening of the present invention includes from about 0.2% to about 7.0%, preferably from about 0.5% to about 3.0%, monoglycerides based upon the weight of the shortening. For an excellent discussion of emulsifiers, see Jens Birk Lauridsen, "Food Emulsifiers: Surface Activity, Edibility, Manufacture, Composition, and Application", *J. Amer. Oil Chem. Soc.*, Vol. 53 (1976), pp. 400–407.

While any emulsifier known in the art may be suitable for use in the low-saturate plastic shortening of the present invention, it is preferable to incorporate from about 0.04% to about 0.4%, preferably from about 0.06% to 0.2%, by weight of the shortening of a long-chain monoglyceride component, in combination with other suitable emulsifiers, when it is desired to improve the taste, texture, emulsion, viscosity and foam-stability of food preparations which contain said shortening. These properties are especially crucial in icings, frostings, and cake batters.

By "long-chain monoglyceride" as used herein is meant saturated $C_{20}$-$C_{24}$ fatty acid monoglycerides. Said monoglycerides could have the fatty acid ester of $C_{20}$-$C_{24}$ fatty acid in the one or two position on the glycerol backbone. Said long-chain monoglycerides must contain at least 50% and preferably at least 60% monobehenin.

The long chain monoglyceride component of the emulsifier can be prepared by the glycerolysis of fully hydrogenated high erucic acid rapeseed oil, for example high-erucic acid rapeseed oil supplied by Humko Products, Memphis, Tenn. 38101. Said glycerolysis is then followed by molecular distillation and/or solvent crystallization to yield a long-chain monoglyceride component meeting the requirements defined hereinabove. For an excellent discussion of synthesis and purification of monoglycerides, see the article entitled "Food Emulsifiers: Surface Activity, Edibility, Manufacture, Composition and Application", by Jens Birk Lauridsen, *J. Amer. Oil Chem. Soc.*, Vol. 53 (1976), pp. 400-407, hereby incorporated by reference herein.

For two excellent discussions of molecular distillation, see H. Szelag and W. Zwierzykowski, "The Application of Molecular Distillation to Obtain High Concentration of Monoglycerides," *Fette Seifen. Anstrichmittel*, Vol 85, No. 11 (1983) pp. 443-46, and Robert K. Lohwater, "Progress Report: Molecular Distillation", *Research/Development*, (January 1971), pp. 36-39, both incorporated by reference herein.

As stated hereinabove, any emulsifier available in the art may be suitable for use in the low-saturate shortening of the present invention, but it is preferable to incorporate from about 0.05% to about 3%, preferably from about 0.15% to about 1.5% (based upon the weight of the shortening), of a long chain diglyceride component. As will be explained in greater detail subsequently herein, the most preferred emulsifier for use in the shortening described herein contains both the long-chain monoglyceride component and the long-chain diglyceride component.

By "long-chain diglyceride" as used herein is meant those diglycerides whose carbon number (as determined by the Carbon Number Profile/Gas Chromatography [CNP/GC] described in Section E of the Analytical Method Section herein) is $C_{38}$-$C_{44}$.

It is necessary that at least about 30%, preferably at least about 50%, of the diglycerides in said long-chain diglyceride component have a carbon number of $C_{40}$. Said long-chain diglyceride component also comprises from about 5% to about 45%, preferably from about 8% to about 35%, unsaturated fatty acids (by weight of the fatty acids therein). It is also especially preferred that at least 50% of said unsaturated fatty acids are in the trans-configuration.

Said diglyceride component controls and significantly retards the beta-prime to beta polymorphic crystal phase transformation which tends to occur in many shortening formulations. This undesirable beta-prime to beta transformation often occurs because of, and/or is partially aggravated by, the presence of tripalmitin and/or tristearin triglycerides at varying concentrations, particularly because the base fats which are the most cost-effective unfortunately contribute a significant amount of tripalmitin and/or tristearin to the final product. Since tristearin and tripalmitin are beta-tending, the use of the less expensive base fats results in a final product wherein the beta-prime crystalline phase is subject to change to the beta crystalline phase over time. The use of the long-chain diglyceride component described herein allows the use of the more cost-effective base fats containing some beta-tending components while maintaining the beta-prime stability of the final product.

Said long-chain diglyceride component can be made by the glycerolysis of a suitable fat blend. For an excellent discussion of glycerolysis, see, e.g., *Bailey's Industrial Oil and Fat Products*. Third Edition, edited by Swern, pp. 952-970 (1964), hereby incorporated by reference herein. For a specific example of how to prepare said long-chain diglyceride component, see Example V herein.

As previously stated herein, it is most preferable that the emulsifier of the shortening of the present invention comprises both the long-chain monoglyceride component and the long-chain diglyceride component as described herein. Although the use of either component alone gives superior results as compared to the use of conventionally-used emulsifiers, the combination of said components is most preferred for use in the low-saturate shortening of the present invention.

A mixture which consists of both a long-chain monoglyceride component and a long-chain diglyceride component is prepared by the glycerolysis of a suitable fat blend. See, e.g., *Bailey's Industrial Oil and Fat Products*. Third Edition, edited by Swern, pp. 952-970 (1964), hereby incorporated by reference herein. For a specific method to prepare one such mixture of a long-chain diglyceride component and a long-chain monoglyceride component, see Example VII.

As stated hereinabove, an emulsifier particularly suitable for use in the shortening of the present invention contains from about 0.2% to about 7%, preferably about 0.5% to about 3.0% monoglycerides (based upon the weight of the shortening), whether or not the preferred long-chain monoglyceride component and/or the preferred long-chain diglyceride component is utilized in the emulsifier. In order to meet said requirements for total monoglycerides (based upon the weight of the shortening), it may be necessary and/or desirable to add commercially available mono- and diglyceride mixtures, including, but not limited to, Atmul 86K, manufactured by Kraft, Inc., Industrial Division, Memphis, Tenn. and Dur-Em 114K, manufactured by Dur-kee, Inc. Joliet, Ill.

PREPARATION OF THE LOW-SATURATE, ALL-PURPOSE PLASTIC SHORTENING

The plastic shortening of the present invention can be made by any process known to one skilled in the art. There is no special apparatus or processing equipment needed; the only requirement is that the three fatty components of the composition, i.e. the specially hydrogenated intermediate-melting fat, the base oil, and the hardstock, exhibit the characteristics described herein. Most important, of course, is that the intermediate-melting fat have the requisite composition of trans-isomers of unsaturated fatty acids so that the saturates in the composition will be utilized more efficiently, thereby forming sufficient solids to achieve a shortening exhibiting the desired plasticity while utilizing a decreased amount of saturates.

The low-saturate shortening of the present invention can be prepared by various conventional means well known in the art for processing plastic shortenings. In general, conventional methods of preparing plastic shortenings involve the steps of (1) heating the shortening to a temperature (e.g. 39°-93° C.; 100°-200° F.) above the melting point of its solid components to form a melt; (2) injecting edible gas (e.g. 10-25 volume percent) into the melt; (3) passing the melted shortening through a scraped wall heat exchanger (e.g. to 7°-21° C.; 45°-70° F.), in a unit such as a "Votator", to form a super-cooled mixture containing small crystals; (4) continuing crystallization into the plastic state while mildly agitating in one or more stages; (5) filling into suitable containers; and then (6) tempering at a constant temperature (e.g. 27°-32° C.; 80°-90° F.) while at rest for several hours (e.g. 12-60 hours).

As previously stated, the low-saturate, all-purpose plastic shortening can be made by any process known in the art, so long as the composition of the low-saturate shortening, and the components therein, is as described herein. Said processes can be varied by one skilled in the art to achieve the shortening of the present invention. Suitable methods and apparati are described in the following U.S. patents, all incorporated by reference herein: U.S. Pat. No. 2,430,596 to Ziels et al. (assigned to Lever Bros. Co.), issued Nov. 11, 1947; U.S. Pat. No. 2,614,937 to Baur et al. (assigned to The Procter & Gamble Co.), issued Oct. 21, 1952; U.S. Pat. No. 2,801,177 to Lutton (assigned to The Procter & Gamble Co.), issued Jul. 30, 1957; U.S. Pat. No. 3,102,814 to Thompson (assigned to Lever Bros. Co.), issued Sep. 3, 1963; U.S. Pat. No. 3,253,927 to Going et al. (assigned to The Procter & Gamble Co.), issued May 31, 1966; and U.S. Pat. No. 3,597,230 to Colby et al. (assigned to The Procter & Gamble Co.), issued Aug. 3, 1971.

EXAMPLES

Example I

Specially Hydrogenated Intermediate Melting Fat

A specially hydrogenated intermediate-melting fat for use in the low-saturate, all-purpose plastic shortening of the present invention is prepared as follows:

A 400 pound blend consisting of 70% soybean oil (I.V.=133) and 30% cottonseed oil (I.V.=107) is prepared and then deaerated at 49° C. (120° F.) for approximately 15 minutes at an absolute pressure of 3 millimeters Hg. The resulting oil blend is placed into a 400 lb. batch hardening unit (Serial #33183, Leader Iron Works, Inc., Decatur, Ill.) and heated to 171° C. (340° F.) under nitrogen. 675 grams of nickel-sulfur catalyst (Nysel SP-7, Engelhard Corporation, Catalyst and Chemicals Division, Edison, N.J. 08818) is added and hydrogen is bubbled through the batch hardening unit at a pressure of 0 pounds per square inch-gauge (hereinafter PSIG). Progress of the reaction is monitored by measuring the Refractive Index (RI)*. The reaction proceeds as follows:

| Time (min.) | Temperature °C. (°F.) | Pressure (PSIG) | Refractive Index (RI) |
|---|---|---|---|
| 0 | 171 (340) | 0 | 49.8 |
| 120 | 211 (411) | 0 | 45.2 |
| 150 | 214 (418) | 0 | 43.4 |
| 180 | 224 (435) | 20 | 42.0 |
| 225 | 231 (448) | 83 | 41.0 |
| 270 | 231 (448) | 144 | 40.4 |

After the reaction proceeds for 150 minutes, an additional 325 grams of Nysel SP-7 catalyst is added. When the reaction reads RI=40.4, the hydrogen is turned off and the resulting intermediate-melting fat is cooled to 66° C. (150° F.). 900 grams of filter aid (Celite 503, Johns-Manville, Co., New York, N.Y.) is added to the intermediate-melting fat and the catalyst is filtered out in a plate and frame filter press (with 1 square foot plates, manufactured by D. R. Sperry Co.).

The resulting intermediate melting fat has an I.V. of 64 5, 24.4% saturated fatty acids (including 14.5% $C_{16}$), 1.2% $C_{18:2}$, and 51.3% trans-isomers of unsaturated fatty acids (68% of all double bonds in the trans configuration)*. The solids content (SFC) of the intermediate melting fat at various temperatures is as follows:

| Temperature °C. (°F.) | % Solids (SFC) |
|---|---|
| 10 (50) | 79.9 |
| 21 (70) | 62.1 |
| 27 (80) | 53.1 |
| 33 (92) | 29.9 |
| 41 (105) | 1.8 |

*Refractive Index (R.I.) is conducted at 60° C. (140° F.) (Butyro Scale). Variations in the R.I. of fats, along with variations in other optical properties of fats, can indicate the structure and compositions of fatty acids and glycerides. Here the drop in R.I. signifies a decrease in the unsaturation of the fatty acids during hydrogenation.
**GCFAC (Gas Chromatography Fatty Acid Composition) is used to define the fatty acid composition of the intermediate-melting fat created by the hydrogenation of the fat blend described hereinabove. The method used is explained in Section B of the Analytical Method Section following the Examples.
***The content of trans-isomers of unsaturated fatty acids of fats and oils is measured by infrared spectrophotometry. The method used is explained in Section C of the Analytical Method Section following the Examples.

Example II

Specially Hydrogenated Intermediate-Melting Fats

Alternative intermediate-melting fats suitable for use in the shortening of the present invention can be prepared from soybean oil or from a soybean/cottonseed oil blend utilizing the method set forth in Example 1, except that the reactions are terminated at different I.V. endpoints.

| | Intermediate-Melting Fat Specifications | | | | |
|---|---|---|---|---|---|
| % Soybean | 100 | 100 | 100 | 70 | 70 |
| % Cottonseed | 0 | 0 | 0 | 30 | 30 |
| I.V. | 69 | 66 | 62 | 69 | 63 |
| Saturates | 20.8 | 21.4 | 27.9 | 20.5 | 26.7 |
| Trans-isomers of unsaturated fatty acids (% of fat) | 54.1 | 54.4 | 50.2 | 53.9 | 49.6 |
| % of double bonds in trans configuration | 67.5 | 70.6 | 69.2 | 67.7 | 67.9 |
| % $C_{16}$ fatty acids | 10.0 | 10.4 | 9.9 | 14.1 | 14.2 |

-continued

| | Intermediate-Melting Fat Specifications | | | | |
|---|---|---|---|---|---|
| % $C_{18:2}$ fatty acids | 2.8 | 0.4 | 1.6 | 2.9 | 1.9 |
| % Solids (SFC) at 21.1° C.(70° F.) | 64.3 | 63.3 | 67.2 | 53.9 | 65.3 |

Example III

Base Oil for Low-Saturate Shortening

A base oil suitable for use in the low-saturate shortening of the present invention is prepared by the following method:

400 pounds of canola oil (I.V.=110) is added into a 400 pound batch hardening unit (Serial #33189, Leader Iron Works, Inc., Decatur, Ill.) and heated to 152° C. (305° F.). 65 grams of fresh nickel catalyst (Nysosel 325, Englehard Corporation, Catalyst and Chemicals Division, Edison, N.J. 08818) is added and hydrogen is bubbled through the oil at 0 PSIG. After about 55 minutes, the reaction is stopped by turning off the hydrogen. The oil is cooled to about 66° C. (150° F.), and 900 grams filter aid is added, and then filtered out as in Example I. The composition of the canola oil before and after hydrogenation is as follows:

| | Before Hydrogenation | After Hydrogenation |
|---|---|---|
| % saturates | 6.3 | 7.4 |
| % $C_{18:3}$ fatty acids | 7.5 | 3.8 |
| % cis-cis fatty acids | 27.4 | 14.1 |
| % trans-isomers | 0.0 | 12.4 |
| I.V. | 110 | 100 |

300 lbs. of base oil is then prepared by blending in 259 lbs. of the partially hydrogenated canola oil (86.3%) with 41 lbs. of the unhydrogenated (I.V. TM 134) sunflower oil (13.7%). The resulting base oil has 7.9% saturates; 3.4% $C_{18:3}$ fatty acids; 21.3% cis-cis fatty acids; 10.8% trans-isomers, and an I.V. of 105.

Example IV

Base oil for Use in Low-Saturate Shortening

A base oil which is produced by a process which minimizes the increase in saturated and trans-fatty acids, and is especially suitable for use in the low-saturate shortenings of the present invention is prepared in a manner similar to Example III. However, prior to hydrogenation, the canola oil is treated in the following manner to reduce the level of catalyst poisons.

65 grams of fresh nickel catalyst is added to 400 lbs. of canola oil. The oil is heated to 177° C. (350° F.) for one hour in a nitrogen atmosphere in the same vessel used for hydrogenation. The catalyst is then filtered from the oil as in Example III. The resulting treated oil is then hydrogenated using fresh catalyst as in Example III, except at 260° C. (320° F.) for 30 minutes. Composition of the canola oil before and after hydrogenation is as follows:

| | Before Hydrogenation | After Hydrogenation |
|---|---|---|
| % saturates | 6.3 | 6.8 |
| % $C_{18:3}$ fatty acids | 7.5 | 3.4 |
| % cis-cis fatty acids | 27.4 | 13.4 |
| % trans-isomers | 0 | 10.8 |
| I.V. | 110 | 100 |

300 lbs. of base oil is then prepared by blending 259 lbs. of the partially hydrogenated canola oil (8.63%) with 41 lbs. of unhydrogenated (I.V.=134) sunflower oil (13.7%). The resulting base oil has 7.4% saturates, 3.0% $C_{18:3}$ fatty acids, 20.7% cis-cis fatty acids; 8.7% trans-isomers, and an I.V. of 105.

Example V

Beta-Prime Stabilizing Long-Chain Diglyceride Component

A beta-prime stabilizing long-chain diglyceride component suitable for inclusion in the emulsifier in the shortening of the present invention is produced as follows: 18 lbs. of food grade glycerol (Superol, manufactured by The Procter & Gamble Company, Cincinnati, Ohio) and 200 grams 50% sodium hydroxide/water solution is heated to 100° C. (212° F.) for approximately 30 minutes under vacuum (approximately 71 cm Hg) in a 25 gallon agitated stainless steel reactor (equipped for heating, refining, and distillation) using nitrogen sparging. The resulting glycerol mixture is cooled to approximately 71° C. (160° F.).

Partially-hydrogenated canola oil having an I.V. of 83.7 and the fatty acid composition set forth below is prepared utilizing the selective hydrogenation process described in Example I, except that the canola oil herein is hydrogenated to an I.V. of 83.7.

| Fatty-Acid Composition (GC-FAC) of Partially-Hydrogenated Canola Oil | |
|---|---|
| Fatty Acid | Percent |
| $C_{16:0}$ | 4.0 |
| $C_{16:1}$ | 0.4 |
| $C_{18:0}$ | 3.9 |
| $C_{18:1}$ | 79.2 |
| $C_{18:2}$ | 7.8 |
| $C_{18:3}$ | 0.6 |
| $C_{20:0}$ | 1.6 |
| $C_{20:1}$ | 0.3 |
| $C_{22:0}$ | 0.6 |
| $C_{22:1}$ | 0.1 |
| $C_{24:0}$ | 0.2 |
| $C_{24:1}$ | 1.3 |
| Others | — |

High-erucic acid rapeseed oil is obtained from Humko Products in Memphis, Tenn. 38101 and is hydrogenated using a nickel catalyst to an I.V. of 0.1. Said oil has a fatty-acid composition as set forth herein below.

| Fatty-Acid Composition (GC-FAC) of the Hydrogenated High-Erucic Acid Rapeseed Oil | |
|---|---|
| Fatty Acid | Percent |
| $C_{16:0}$ | 3.1 |
| $C_{16:1}$ | — |
| $C_{18:0}$ | 36.2 |
| $C_{18:1}$ | 0.1 |
| $C_{18:2}$ | — |
| $C_{18:3}$ | — |
| $C_{20:0}$ | 7.6 |
| $C_{20:1}$ | — |
| $C_{22:0}$ | 51.3 |

-continued

| Fatty-Acid Composition (GC-FAC) of the Hydrogenated High-Erucic Acid Rapeseed Oil | |
|---|---|
| Fatty Acid | Percent |
| $C_{22:1}$ | — |
| $C_{24:0}$ | 1.4 |
| $C_{24:1}$ | — |
| Others | 0.2 |

12 lbs. of the partially-hydrogenated canola oil, 100 lbs. of the hydrogenated high-erucic acid rapeseed oil, and the glycerol mixture prepared and cooled as described above are mixed together in a reactor. The resulting reaction mixture is heated to approximately 204° C. (400° F.) using nitrogen sparging and mechanical agitation under slight positive pressure (approximately 2-7 PSIG). After approximately 1½ hours reaction time, the temperature is reduced to approximately 177° C. (350° F.) and vacuum (approximately 71 cm Hg) is applied to the reactor.

Following a distillation period of approximately 45 minutes wherein the excess glycerol molecules are removed and shifting of the monoglycerides to diglycerides to triglycerides occurs, the residual base catalyst is neutralized with 335 grams of a 75% phosphoric acid ($H_3PO_4$) solution.

100 lbs. of the diglyceride component is produced and the final composition is analyzed using Carbon Number Profile by Gas Chromatography* (hereinafter CNP-GC). Said diglyceride component is found to have the following composition:

| CNP-GC Analysis of the Diglyceride Additive | |
|---|---|
| | Percent |
| monoglycerides | 14 |
| diglycerides | 58 |
| triglycerides | 27.1 |
| CNP-GC (Carbon Number) | |
| $C_{20}$–$C_{24}$ | 7.0 |
| $C_{22}$ | 6.0 |
| $C_{38}$–$C_{44}$ | 42.6 |
| $C_{40}$ | 22.2 |

*CNP-GC (Carbon Number Profile by Gas Chromatography)—Carbon Number Profile (CNP) is used to identify the triglyceride composition of the structural fat as determined by Gas Chromatography (CNP-GC). The CNP indicates the percentage of glycerides having a certain number of carbon atoms for the combined fatty acid residues attached to the glyceride. The method of determining CNP-GC is explained in Section E of the Analytical Method Section following the Examples.

| Fatty-Acid Composition of the Beta-Prime Stabilizing Diglyceride Additive (determined by GC-FAC) | |
|---|---|
| Fatty Acid | Percent |
| $C_{16}$ | 3.4 |
| $C_{18}$ | 32.6 |
| $C_{20}$ | 6.8 |
| $C_{22}$ | 45.8 |
| $C_{24}$ | 1.2 |
| $C_{18:1}$ | 8.5 |

Example VI

Long Chain Monoglyceride Component

A long-chain monoglyceride component suitable for inclusion in the emulsifier in the shortening of the present invention is produced as follows:

300 lbs. of Compritol 888 (manufactured by Gattefosse Corporation, 3 Westchester Plaza, Elmsford, N.Y. 10523) is melted and pumped into a continuous centrifugal molecular still (CMS 15A, manufactured by Consolidated Vacuum Corp. 525 Lee Road, Rochester, N.Y. 14603) and distilled at about 165° C. (325° F.) rotor feed temperature, at about 212° C. (413° F.) rotor residue temperature and at about 15 $10^{-3}$ hPa bell jar pressure. The pumping rate is 10 kgs/hr. The distillates are collected and the residues are passed through the distillation process repeatedly while temperatures are increased by about 3° C. (37.4° F.) at each pass. After the repeated passes, the distillates are melted, combined, and redistilled using similar conditions but somewhat lower temperatures and a reduced pumping rate (6 kgs/hr). Optimum separation is facilitated by the monitoring of the conditions by CNP-GC analysis.

The fractionation by molecular distillation produces at least 82% monobehenin and at least 92% pure monoesters.

| | Percent |
|---|---|
| CNP-GC of Compritrol 888 | |
| monoglyceride | 23.1 |
| diglyceride | 63.3 |
| triglyceride | 12.7 |
| GC-FAC of Compritrol 888 | |
| $C_{22:0}$ | 89.0 |
| $C_{20:0}$ | 6.3 |
| $C_{18:0}$ | 1.5 |
| $C_{24:0}$ | 1.0 |

Example VII

Emulsifier Blend of Long Chain Mono- and Long Chain Diglycerides

An emulsifier blend of long chain mono- and long chain diglycerides is prepared as follows:

160 grams of 50% sodium hydroxide solution and 9 lbs. of food grade glycerol (Superol, manufactured by The Procter & Gamble Company, Cincinnati, Ohio) is heated and dried as described in Example V.

75.5 lbs. of hydrogenated high erucic acid rapeseed oil (I.V.=0.1) (prepared as described in Example 5) is mixed with 14.5 lbs. of hydrogenated soybean oil (I.V.=69.7) (prepared as described in Examples 1 and 2) in the reactor containing the glycerol mixture and is heated to 204° C. (400° F.) using mechanical agitation and nitrogen sparging at a pressure of 5 PSIG.

After a reaction time of 60 minutes, a vacuum (approximately 71 cm Hg) is applied and excess glycerol is distilled for 30 minutes, and the mixture is neutralized with 266 grams of a 75% phosphoric acid ($H_3PO_4$) solution and cooled to 77° C. (170° F.) under vacuum (approximately 71 cm Hg). The reactor is then brought to atmospheric pressure and the product is then discharged.

The composition of the emulsifier blend is measured by Carbon Number Profile by Gas Chromatography and is as follows:

| | Percent |
|---|---|
| Monoglycerides | |
| $C_{16}$ | 1.4 |
| $C_{18}$ | 11.8 |
| $C_{20}$ | 1.4 |
| $C_{22}$ | 9.3 |
| Diglycerides | |
| $C_{34}$ | 2.2 |

-continued

| | Percent |
|---|---|
| $C_{36}$ | 10.9 |
| $C_{38}$ | 4.5 |
| $C_{40}$ | 19.2 |
| $C_{42}$ | 3.4 |
| $C_{44}$ | 8.8 |

Example VIII

Low-Saturate, All-Purpose Plastic Shortening 400 pounds of the low-saturate, all-purpose plastic shortening of the present invention is prepared as follows:

| Components | Wt. % | Pounds |
|---|---|---|
| Intermediate-melting fat (prepared as described in Example I) | 16.2 | 64.8 |
| Base oil (prepared as described in Example III) | 73.08 | 292.3 |
| Sunflower Oil (I.V. = 134) | 10.0 | 40.0 |
| Canola Oil (I.V. = 100) | 63.08 | 252.3 |
| Hardstock Cottonseed Stearine Hardstock (I.V. = 1) | 7.2 | 28.8 |
| Emulsifier | 3.52 | 14.1 |
| Mono and diglycerides (Atmul 86K, Kraft, Inc., Memphis, TN) | 3.0 | 12.0 |
| Long-Chain Diglyceride Component (prepared as described in Example V) | 0.4 | 1.6 |
| Long-Chain Monoglyceride (prepared as described in Example VI) | 0.12 | 0.48 |

The intermediate melting fat, the base oil, and the hardstock are blended and are then deodorized at 263° C. (505° F.) for approximately 2.5 hours at an absolute pressure of approximately 6–8 millimeters Hg. The resulting mixture is cooled to 6.6° C. (150° F.) and then the emulsifier blend is added.

A plastic shortening is made from this mix in the following manner. The mix is melted at 54° C. (130° F.). 12.0% by volume nitrogen is continuously injected into the oil and it is pumped through a scraped wall heat exchanger ("Votator") in which the oil is rapidly chilled with agitation to 13° C. (55° F.) in less than about two minutes. The chilled supercooled mixture is then passed through an agitated unrefrigerated crystallization vessel known as a picker box and then packed into one pound shortening cans. The product is tempered at 29° C. (85° F.) for 48 hours.

The resulting plastic shortening contains 17.6% saturates, 13.1% solids at 21° C. (70° F.), and 18.6% trans-isomers. The shortening also contains emulsifier components with the following carbon numbers:

| Carbon Number | Wt. % in Shortening |
|---|---|
| $C_{20}-C_{24}$ | 0.14 |
| $C_{22}$ | 0.13 |
| $C_{38}-C_{44}$ | 0.17 |
| $C_{40}$ | 0.09 |

Example IX

Low-Saturate, All-Purpose Shortening

Another low-saturate, all-purpose plastic shortening is prepared as described in Example VIII with the following composition:

| Components | Wt. % | Pounds |
|---|---|---|
| Intermediate-melting fat (prepared as described in Example I) | 17.0 | 68 |
| Base Oil (prepared as described in Example IV) | 72.0 | 288 |
| Hardstock Palm Oil Hardstock (I.V. = 1) | 7.2 | 28.8 |
| Emulsifier Atmul 86K (Kraft Inc., Memphis, TN) | 2.5 | 10.0 |
| Long-Chain Mono- and Diglyceride Emulsifier (prepared as described in Example VII) | 1.3 | 5.2 |

The shortening is processed as described in Example VIII. The shortening contains 17.6% saturates, 13.6% solids at 21° C. (70° F.), and 16.2% trans-isomers. The shortening also contains emulsifier components with the following carbon numbers, as calculated from the emulsifier composition:

| Carbon Number | Wt. % in Shortening |
|---|---|
| $C_{20}-C_{24}$ | 0.14 |
| $C_{22}$ | 0.12 |
| $C_{38}-C_{44}$ | 0.47 |
| $C_{40}$ | 0.25 |

Analytical Methods

A. Solids Content Index

The method for determining Solids Content Index values of shortening by dilatometry is described by Fulton, Lutton and Willie, J. Amer. Oil Chem. Soc., Vol. 31 (1954), pp. 98–103, (herein incorporated by reference) and also by AOCS Official Method CDIO-57 (herein incorporated by reference). The test involves a dilatometric measurement of the amount by which a fat expands when heated from a specific temperature to complete melting. Since this expansion is due to both a volume increase when solids change to liquids without a temperature change and a volume increase due to thermal expansion without change in phase from solid to liquid, allowance is made for the thermal expansion so that the change in volume gives a measure of the amount of solid phase present at the temperature of measurement. The test has been modified so that readings are taken after 30 minutes at the temperature of measurement.

B. Fatty Acid Composition (GCFAC Values)

Principle

The fatty acid composition of the triglycerides of the fatty components of the low-saturate, all-purpose plastic shortening of the present invention is measured by gas chromatography. First, fatty acid methyl esters of the triglycerides of the various components, are prepared by any standard method (e.g., by transesterification using sodium methoxide), and then separated on a capillary column which is coated with SP-2340 stationary phase. The fatty acid methyl esters are separated by chain length and degree of unsaturation. A split injection is made with flame ionization detection. Quantitation is performed by an area normalization method. This method can separate fatty acid methyl esters from C14 to C24.

| Equipment | |
|---|---|
| Gas Chromatograph | Hewlett-Packard 5880A, or equivalent, equipped with a capillary injection system and flame ionization detector, Hewlett-Packard Co., Scientific Instruments Div., 1601-T California Ave., Palo Alto, CA 94304 |
| Injector | Autosampler Hewlett-Packard 7671A, or equivalent |
| Column | 60 meters × 0.25 millimeter inner diameter, fused silica capillary column coated with SP-2340 (0.20 micron film thickness Supelco #2-4023), Hewlett-Packard Co., Scientific Instruments Division |
| Data System | Hewlett-Packard 3350 Laboratory Automation System, 3000-T Hanover St., Palo Alto, CA 94304 |
| Recorder | Kipp & Zonen, BD40, Kipp & Zonen |
| Syringe | 10 uL, Hamilton 701N |

Reference Standards

One reference standard of fatty acid methyl esters (FAME) is used each day of operation to verify proper operation of this method. A reference mixture of fatty acid methyl esters (FAME) is used to check the operation of the instrument. Said reference mixture has the following fatty acid composition: 1% $C_{14:0}$, 4% $C_{16:0}$, 3% $C_{18:0}$, 45% $C_{18:1}$, 15% $C_{18:2}$, 3% $C_{18:3}$, 3% $C_{20:0}$, 3% $C_{22:0}$, 20% $C_{22:1}$, and 3% $C_{24:0}$.

The reference mixture of FAME should be diluted with hexane and then injected into the instrument. A new vial of FAME reference mixture should be opened every day since the highly unsaturated components, $C_{18:2}$ and $C_{18:3}$, oxidize easily. The results from the reference standards should be compared with the known values and a judgment made concerning the completed analysis. If the results of the reference standards are equal to or within ±2 standard deviations of the known values, then the equipment, reagents and operations are performing satisfactorily.

Instrumental Set-up a. Install the column in the gas chromatograph, and set up the instrumental conditions as defined immediately below under Instrumental Conditions.
b. Set up the data system with the appropriate method to acquire and analyze the data. The retention times may have to be adjusted in the method due to instrument variations. Consult the data system reference manual on how to do this—HP3350 User's Reference Manual. Unity response factors are used for each component.

| INSTRUMENTAL CONDITION | |
|---|---|
| Instrument | Hewlett-Packard 5880A |
| Column | 60 meter × 0.20 millimeter inner diameter I.D., coated with SP-2340, 0.2 micron film thickness, Supelco #2-4023 |
| Column head pressure | 15.0 pounds per square inch |
| Carrier gas | Helium |
| Injector "A" temperature | 210° C. |
| Split vent flow | 60 milliliters/minute |
| Septum purge | 1.0 milliliters/minute |
| Oven temperature profile: | |
| Initial temperature | 150° C. |
| Initial time | 0 minute |
| Rate 1 | 1.30° C./minute |
| Final temp 1 | 1.85° C. |
| Final time 1 | 0 minute |
| Rate 2 | 10.00° C./minute |
| Final temp 2 | 225° C. |
| Final time 2 | 10.00 minute |
| Post Value | 225° C. |
| Post Time | 0 minute |
| Detector | FID |
| Detector temp | 230° C. |
| Make-up gas | 30 milliliters/minute |
| Detector $H_2$ flow | 30 milliliters/minute |
| Detector air flow | 400 milliliters/minute |

2. Analysis of Samples—(The samples are analyzed with an area normalization procedure.)

a. Prepare fatty acid methyl esters of the reference standard and triglycerides of the components of the shortening of the present invention.
b. Set up a sequence in the LAS data system to inject the samples and reference standard.
c. Activate the autosampler to inject 1.0 microliter of the samples and standard in the sequence. The gas chromatograph will automatically begin its temperature program and the data system will collect and analyze the data for the sequence.
3. The peak areas for each methyl ester are electronically integrated by the data system. The fatty acid composition and percentage of cis-cis fatty acids are determined by summing the appropriate peaks.
4. The percentage of methylene interrupted, cis-cis double bonds species is calculated by summing the percentages of methyl linoleate and methyl linolenate as identified by $C_{18:2}$ and $C_{18:3}$.

C. Infrared IR Measurement

The content of trans-isomers of unsaturated fatty acids in the shortening of the present invention and the components therein is measured by infrared spectrometry. The method used is identical to that described by Madison et al. in "Accurate Determination of Trans Isomers in Shortening and Oils by Infrared Spectrophotometry," in *J. Amer. Oil Chem. Soc.*, Vol. 59, No. 4 (April, 1982), pp. 178-81, (herein incorporated by reference), with two exceptions: 1) the method utilized in the present invention employed a Nicolet, Model 20DXC, Infrared Spectrometer (Nicolet Instrument Corporation, Madison, Wis.) which was equipped with a deuterated triglycine-sulfate detector and used in lieu of a Beckman IR012 spectrophotometer; and 2) methyl stearate was replaced with methyl oleate as a calibration standard to be used with methyl elaidate in the construction of the calibration curve.

D. Solid Fat Content

The method for determining Solid Fat Content (SFC) values of a fat by PMR is described in AOCS Official Method CD 16-81, (herein incorporated by reference). Before determining SFC values, the fat sample is heated to a temperature of 60° C. for at least 0.5 hours or until the sample is completely melted. The melted sample is then tempered at a temperature of 26.7° C. for 15 minutes, 0° C. for 15 minutes, 26.7° C. for 30 minutes, and 0° C. for 15 minutes. After tempering the SFC value of the fat sample at temperatures of 10° C., 21.1° C., 26.7° C., 33.3° C., and 40.5° C. is determined by pulsed magnetic resonance (PMR) after equilibrating for 30 minutes at each temperature.

E. CNP-GC Method

The carbon number profile (CNP) of the triglycerides present in the reduced calorie fat can also be determined by programmed temperature-gas chromatography (GC) using a short fused silica column coated with methyl silicone for analysis and characterization of the composition by molecular weight. The triglycerides are separated according to their respective carbon numbers, wherein the carbon number defines the total number of carbon atoms on the combined fatty acid residues. The carbon atoms on the glycerol molecule are not counted. Glycerides with the same carbon number will elute as the same peak. For example, a triglyceride composed of three $C_{16}$ (palmitic) fatty acid residues will co-elute with triglycerides made up of one $C_{14}$ (myristic), one $C_{16}$ and one $C_{18}$ (stearic) fatty acid residue or with a triglyceride composed of two $C_{14}$ fatty acid residues and one $C_{20}$ (arachidic) fatty acid residue.

Preparation of the fat sample for analysis is as follows: 1.0 ml. of a tricaprin internal standard solution (2 microg./ml.) is pipetted into a vial. The methylene chloride solvent in the standard solution is evaporated using a steam bath under a nitrogen stream. Two drops of the fat sample (20 to 40 microg.) are pipetted into a vial. If the fat sample is solid, it is melted on a steam bath and stirred well to insure a representative sample. 1.0 ml. of bis (trimethylsilytrifluoroacetamide) (BSTFA) is pipetted into the vial which is then capped. The contents of the vial are shaken vigorously and then placed in a heating block (temperature of 100° C.) for about 5 minutes.

For determining the CNP/GC of the prepared fat samples, a Hewlett-Packard 5880A series gas chromatograph equipped with temperature programming and a hydrogen flame ionization detector is used together with a Hewlett-Packard 3351B data system. A 2 m. long, 0.22 mm. diameter fused silica capillary column coated with a thin layer of methyl silicone (Chrompak CP-SIL 5) is also used. The column is heated in an oven where temperature can be controlled and increased according to a specified pattern by the temperature programmer. The hydrogen flame ionization detector is attached to the outlet port of the column. The signal generated by the detector is amplified by an electrometer into a working input signal for the data system and recorder. The recorder prints out the gas chromatograph curve and the data system electronically integrates the area under the curve. The following instrument conditions are used with the gas chromatograph:

| | |
|---|---|
| Septum purge | 1 ml./min. |
| Inlet pressure | 5 lbs./in.$^2$ |
| Vent flow | 75 ml./min. |
| Makeup carrier | 30 ml./min. |
| Hydrogen | 30 ml./min. |
| Air | 400 ml./min. |

1.0 microl. of the prepared fat sample is taken by a gas-tight syringe and injected into the sample port of the gas chromatograph. The components in the sample port are warmed up to a temperature of 365° C. and swept by a helium carrier gas to push the components into the column. The column temperature is initially set at 175° C. and held at this temperature for 0.5 min. The column is then heated up to a final temperature of 355° C. at a rate of 25° C./min. The column is maintained at the final temperature of 355° C. for an additional 2 mins.

The chromatographic peaks generated are then identified and the peak areas measured. Peak identification is accomplished by comparison to known pure glycerides previously programmed into the data system. The peak area as determined by the data system is used to calculate the percentage of glycerides having a particular Carbon Number ($C_N$) according to the following equation:

$$\% \ C_N = (\text{Area of } C_N/S) \times 100$$

wherein S = sum of Area of $C_N$ for all peaks generated.

The area of $C_N$ is based upon the actual response generated by the chromatograph multiplied by a response factor for glycerides of the particular Carbon Number. These response factors are determined by comparing the actual responses of a mixture of pure glycerides of various Carbon Numbers to the known amounts of each glyceride in the mixture. A glyceride generating an actual response greater than its actual amount has a response factor less than 1.0; likewise, a glyceride generating a response less than that of its actual amount has a response factor of greater than 1.0. The mixture of glycerides used (in a methylene chloride solution) is as follows:

| Component | Carbon No. | Amount (mg./ml.) |
|---|---|---|
| Palmitic acid | 16 | 0.5 |
| Monopalmitin | 16 | 0.5 |
| Monostearin | 18 | 0.5 |
| Dipalmitin | 32 | 0.5 |
| Palmitostearin | 34 | 0.5 |
| Distearin | 36 | 0.5 |
| Tripalmitin | 48 | 1.5 |
| Dipalmitostearin | 50 | 1.5 |
| Disteropalmitin | 52 | 1.5 |
| Tristearin | 54 | 1.5 |

What is claimed is:

1. A low-saturate, all-purpose plastic shortening which consists essentially of:
(a) about 10% to about 30% triglyceride intermediate-melting fat, said intermediate-melting fat comprising from about 14% to about 35% $C_{12}$–$C_{18}$ saturated fatty acids; at least about 8% $C_{16}$ saturated fatty acids: at least about 40% trans-isomers of unsaturated fatty acids by percentage of total fat; at least about 60% of all double bonds in the trans configuration; at least about 40% solids at 21.1° C.; no more than about 5% $C_{18:2}$ fatty acids; and an iodine value of about 55 to about 75;

(b) about 5% to about 14% fully- or substantially-hydrogenated hardstock, said hardstock comprising at least about 33% $C_{16}$ saturated fatty acids, and an iodine value of about 12 or less;
(c) about 50% to about 84% unhydrogenated or partially-hydrogenated base oil, said base oil comprising no more than about 11% $C_{12}$–$C_{18}$ saturated fatty acids; and an iodine value of about 75 or more; and
(d) about 0.5% to about 10% of an emulsifier.

2. A shortening according to claim 1 wherein the emulsifier of (d) includes from about 0.2% to about 7% monoglycerides based upon the weight of the shortening.

3. A shortening according to claim 2 wherein the emulsifier of (d) includes from about 0.04% to about 0.4% based upon the weight of the shortening, of a $C_{20}$–$C_{24}$ monoglyceride component, wherein at least 50% of the $C_{20}$–$C_{24}$ fatty acid monoglycerides are monobehenin.

4. A shortening according to claim 2 wherein the emulsifier of (d) includes from about 0.05% to about 3% based weight of the shortening of a long-chain diglyceride component wherein said diglycerides have a carbon number of $C_{38}$–$C_{44}$, wherein at least about 30% of the diglycerides in said component have a carbon number of $C_{40}$, and wherein said long-chain diglyceride component comprises at least about 5% to about 45% unsaturated fatty acids by weight of the fatty acids therein.

5. A shortening according to claim 2 which consists essentially of:
(a) less than about 20% $C_{12}$–$C_{18}$ saturated fatty acids; and
(b) at least about 12% solids at 21.1° C.

6. A shortening according to claim 5 which consists essentially of:
(a) about 13% to about 25% intermediate-melting fat, said intermediate-melting fat comprising from about 16% to about 30% $C_{12}$–$C_{18}$ saturated fatty acids; at least about 8% $C_{16}$ saturated fatty acids; at least about 45% trans-isomers of unsaturated fatty acids by percentage of total fat; at least about 65% of all double bonds in the trans configuration; at least about 45% solids at 21.1° C.; no more than about 3% $C_{18:2}$ fatty acids; and an iodine value of about 60 to about 70;
(b) about 6% to about 10% fully- or substantially-hydrogenated hardstock, said hardstock comprising at least about 36% $C_{16}$ saturated fatty acids and an iodine value of about 10 or less;
(c) about 60% to about 79% unhydrogenated or partially hydrogenated base oil, said base oil comprising no more than about 8% $C_{12}$–$C_{18}$ saturated fatty acids; an iodine value of about 94 or more; no more than about 5% $C_{18:3}$ fatty acids; and at least about 14% cis-cis polyunsaturated fatty acids; and
(d) about 2% to about 5% of an emulsifier.

7. A shortening according to claim 6 wherein the base oil of (c) has no more than about 17% trans-isomers of unsaturated fatty acids.

8. A shortening according to claim 6 wherein the emulsifier of (d) consists of from about 0.5% to about 3.0% monoglycerides based upon the weight of the shortening.

9. A shortening according to claim 6 wherein at least about 80% of the $C_{16}$ saturated fatty acids of the hardstock of (c) are esterified to either the one or the three position of the glycerol backbone of the triglyceride molecule.

10. A shortening according to claim 9 wherein the polyunsaturate/saturate ratio is at least about 0.5.

11. A shortening according to claim 10 wherein the polyunsaturate/saturate ratio is at least about 0.8.

12. A shortening according to claim 10 wherein the hardstock of (b) has an iodine value of about 5 or less.

13. A shortening according to claim 12 wherein the base oil of (c) has at least about 17% cis-cis polyunsaturated fatty acids.

14. A shortening according to claim 12 wherein at least about 90% of the $C_{16}$ saturated fatty acids of the hardstock of (c) are esterified to either the one or the three position of the glycerol backbone of the triglyceride molecule.

15. A shortening according to claim 3 wherein the emulsifier of (d) contains from about 0.06% to about 0.2% based upon the weight of the shortening of said $C_{20}$–$C_{24}$ fatty acid monoglyceride component.

16. A shortening according to claim 15 wherein at least 60% of said $C_{20}$–$C_{24}$ monoglycerides are monobehenin.

17. A shortening according to claim 4 wherein the emulsifier of (d) contains from about 0.15% to about 1.5% based upon the weight of the shortening of said diglyceride component.

18. A shortening according to claim 17 wherein at least about 50% of the diglycerides of said component have a carbon number of $C_{40}$ and wherein said diglyceride component comprises from about 8% to about 35% unsaturated fatty acids by weight of the fatty acid therein.

19. A shortening according to claim 18 wherein at least of the unsaturated fatty acids of the diglyceride component are in the trans-configuration.

20. A shortening according to claim 5 which consists essentially of:
a) less than about 18% $C_{12}$–$C_{18}$ saturated fatty acids;
b) less than about 20% trans-isomers of unsaturated fatty acids; and
c) at least about 13% solids at 21.1° C.

21. A shortening according to claim wherein the hardstock of (b) includes from about 0.2% to about 1.0% by weight of the shortening high-erucic acid rapeseed oil hardstock having an Iodine Value of no more than about 15.

* * * * *